April 2, 1940.  H. L. EASTUS  2,196,109

HOLLOW GLASS BUILDING BLOCK

Filed April 16, 1937

Harold L. Eastus
INVENTOR

BY Rule + Hoge
ATTORNEYS

Patented Apr. 2, 1940

2,196,109

UNITED STATES PATENT OFFICE 2,196,109

HOLLOW GLASS BUILDING BLOCK

Harold L. Eastus, Muncie, Ind., assignor to Owens-Illinois Glass Company, a corporation of Ohio Application April 16, 1937, Serial No. 137,228

1 Claim. (Cl. 72—42)

The present invention relates to hollow glass building blocks. While the invention is primarily concerned with the production of hollow glass building blocks, it is also well adapted for embodiment in, and in the manufacture of, cup-like glass articles which are produced by a pressing operation.

An object of the invention is the provision of a hollow glass building block consisting of sections intended to be bonded together to produce a hollow block, each section having embedded therein, wire mesh which re-enforces the glass and materially increases its resistance to fire conditions, strains, etc.

Another object of the invention is the provision of a re-enforcing means for hollow glass blocks which while not preventing cracking and checking of the glass when exposed to extreme heat, will prevent shattering of the glass and hold the parts in such positions that the checks and cracks will reseal upon cooling of the structure.

A further object of the invention is the provision and means for placing the re-enforcing medium (wire mesh) in the molded glass sections.

Other objects will be in part apparent and in part pointed out hereinafter.

Figure 5:
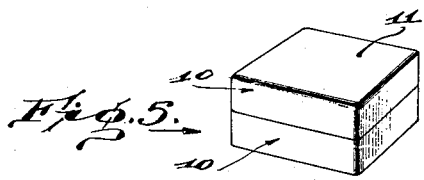
Fig. 5 is a perspective view of one of the blocks.

Blocks of the type in the manufacture of which the present invention is particularly concerned, are made up of pairs of cup-like sections 10 (Fig. 5) bonded together by any suitable medium and including opposed faces 11 which may be decorated with ribs, prisms or other means for diffusing light.

According to my invention, each cup-like section 10 includes the aforementioned face wall 11 and a continuous upstanding side wall 12, the latter terminating in a sealing surface 13 to which a suitable bonding medium is applied. Embedded in the inner face of the wall 11 and extending a short distance upwardly just beneath the surface of the side wall 12 is a section of wire mesh. Obviously this wire mesh may be terminated at any desired point dependent upon the particular requirements of the user.

Figure 1:
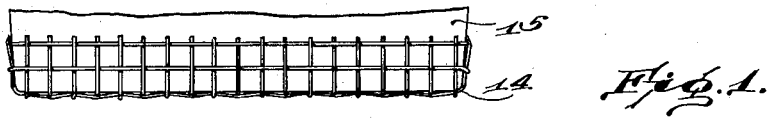
Fig. 1 is a fragmentary sectional elevational view illustrating my method and one form of apparatus for placing wire mesh in a glass block section.
Figure 2:
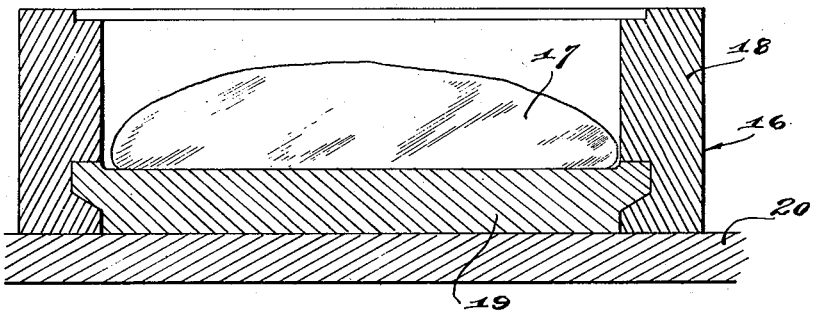
Fig. 2 is a detail sectional elevational view showing the actual pressing of the wire mesh into the glass just prior to completion of the block section.
Figure 3:
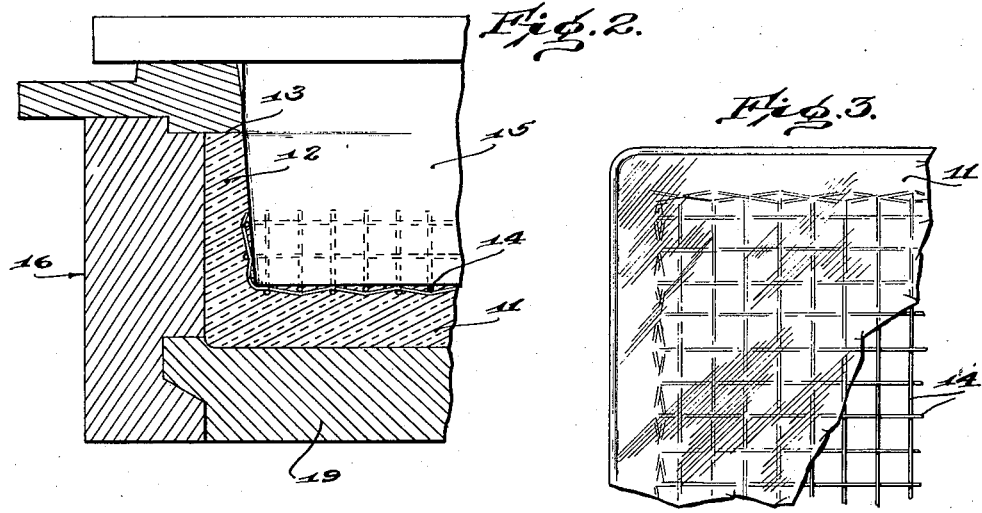
Fig. 3 is a fragmentary elevational view of a glass block section, parts being broken away to expose the re-enforcing wire mesh to view.
Figure 4:
Fig. 4 is an elevational view of a wall section made up of re-enforced blocks.

In the application of the re-enforcing mesh it is first placed upon the press plunger 15 which constitutes a part of the apparatus for forming the block sections. The mesh may be held in place on the plunger solely by friction and in substantially the fashion illustrated in Fig. 1. This press plunger with the section of wire mesh 14 thereon is then moved downwardly into a forming mold 16 to which a mold charge of molten glass 17 has previously been delivered. As indicated in Fig. 2, the wire mesh becomes embedded in the glass substantially at the time the cup-like section assumes its final form. Withdrawal of the press plunger 15 will of course separate it from the mesh owing to the fact that the latter has become embedded in the glass and said glass has become sufficiently set and hardened to firmly grip the mesh.

The mold 16 may be of conventional or any preferred form and includes upstanding side walls 18 and a mold bottom plate 19, all of which are mounted upon a holder 20.

Modifications may be resorted to within the spirit and scope of the appended claim.

I claim:

A hollow glass building block comprising generally rectangular cup-like sections bonded together at the rim portions thereof, said block including opposed faces intended to be exposed when the block is built into a wall structure with similar blocks and including side faces intended to be bonded to similar faces formed on adjacent blocks in the wall structure, and a wire mesh of cup-shape configuration embedded in the glass of each section, said wire mesh lying close to the inner surface of each of the inner faces of the section and being coextensive with that face of the section which will be exposed when the block is built into a wall structure, the wire mesh of each section being spaced from and independent of the wire mesh of the other section.

HAROLD L. EASTUS.